United States Patent

Hunter et al.

[15] 3,701,096

[45] Oct. 24, 1972

[54] DETECTION OF ERRORS IN SHIFT REGISTER SEQUENCES

[72] Inventors: Paul Douglas Hunter, Middletown Twsp.; Richard Erving Machol, Jr., Freehold, both of N.J.

[73] Assignee: Bell Telephone Laboratories, Incorporated, Murray Hill, Berkeley Heights, N.J.

[22] Filed: Sept. 1, 1971

[21] Appl. No.: 177,047

[52] U.S. Cl...........340/146.1 D, 235/92 EC, 235/153

[51] Int. Cl.............................H03k 5/18, G06m 3/12

[58] Field of Search.....340/146.1 D; 235/92 EC, 153

[56] References Cited

UNITED STATES PATENTS 3,493,929 2/1970 Webb..............340/146.1 D X

*Primary Examiner*—Eugene G. Botz
*Assistant Examiner*—R. Stephen Dildine, Jr.
*Attorney*—R. J. Guenther et al.

[57] ABSTRACT

Errors occurring in shift register sequences, such as due to noise bursts or internal shift register faults, are detected by adding a single additional stage to the decoding shift register and connecting it to the usual decoding logic gates in the same pattern as the other shift register stages. Errors are thus caused to appear as a predetermined output from the decoding logic, which output is detected readily by a flip-flop connected thereto.

9 Claims, 2 Drawing Figures

DETECTION OF ERRORS IN SHIFT REGISTER SEQUENCES

BACKGROUND OF THE INVENTION

This invention relates to error detection and, more particularly, to a method and arrangement for detecting errors in shift register sequences.

Shift register sequences, sometimes called shift counter sequences, comprise repeated, sequential patterns of up to $2^n$ bits in which all groups of $n$ adjacent bits are unique. They have found wide use in a variety of applications, including particularly computer sequencing and timing arrangements. For example, it is known in magnetic disc and drum memory systems to record a shift register sequence, repeated for each word location, as the word clock track. The word clock track is then used during storage and retrieval of information, in conjunction with the usual bit timing track, to provide the system with the ability to readily and accurately determine which bit of a word in memory is being written or retrieved at any time.

A problem exists, however, in detecting rapidly any errors which may occur in shift register sequences, such as due to noise bursts or circuit faults. In the above-mentioned memory systems, for example, immediate error detection is desirable, and in some systems essential, to prevent incorrect system action from being taken. Various arrangements are known for detecting errors in shift register sequences but each suffers from disadvantages related to speed, complexity, cost and reliability.

SUMMARY OF THE INVENTION

It is accordingly an object of this invention to provide a new and improved arrangement for detecting errors in shift register sequences.

More particularly, it is an object of this invention to provide a simple and inexpensive arrangement for detecting errors in shift register sequences, which alleviates the disadvantages of known error detecting arrangements.

These and other objects are attained in an illustrative embodiment of an error detecting arrangement utilized, by way of example, as part of a timing circuit in a dynamic memory system. Typically, in such systems, as mentioned above, the shift register sequences are stored in one of the memory clock tracks and the bit timing pulses in another, with the shift register sequences corresponding to individual word or position locations in the memory. During reading and writing operations, each shift register sequence is directed to a timing circuit, typically comprising an $n$-bit shift register and decoding logic, for generating a $k$-bit word clock where $k$ is greater than $2^{n-1}$ and less than or equal to $2^n$.

According to our invention, the usual timing circuit is modified simply and inexpensively to provide detection substantially instantaneously of an incorrect sequence shifted into the register. Specifically, an additional stage is added to the shift register and connected to the decoding logic in the same manner as the other shift register stages, and a flip-flop is connected to the output of the decoding logic for indicating the presence of an error in the input sequence. Furthermore, this arrangement also advantageously detects errors caused by internal component failures, such as one of the shift register stages remaining permanently set or reset.

BRIEF DESCRIPTION OF THE DRAWING

The above and other objects and features of the invention may be fully apprehended from the following detailed description and accompanying drawing in which.

DETAILED DESCRIPTION

Figure 1:
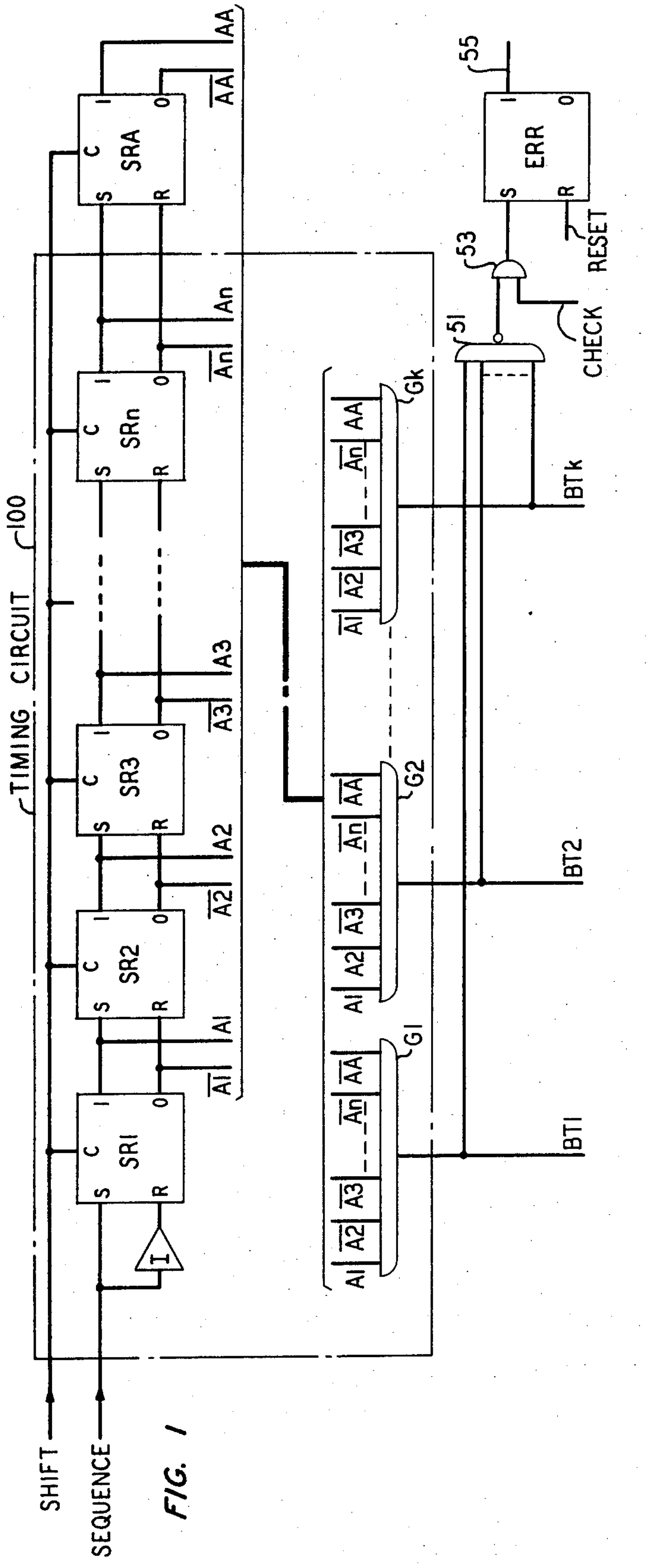
FIG. 1 is a diagram of an illustrative embodiment of an error detecting arrangement in accordance with the principles of our invention.

In FIG. 1 a typical arrangement employing shift register sequences is shown, illustratively depicted as a decoding arrangement comprising timing circuit 100 employed, for example, in a dynamic memory system such as a magnetic disc or drum memory system. The memory system (not shown) is assumed to have at least two clock channels or tracks, one a bit clock track and the other a word clock track. The bit clock track comprises a train of bit timing pulses and the word clock track comprises a particular shift register sequence of bit pulses repeated for each memory word location. The bit clock track and the word clock track are utilized during memory reading and writing operations for generating a multibit word clock, via timing circuit 100, in a manner well known in the art. It will be apparent from the description herein, however, that our invention may be employed advantageously in a variety of other applications using shift register sequences, such as digital ranging and tracking systems.

Figure 2:
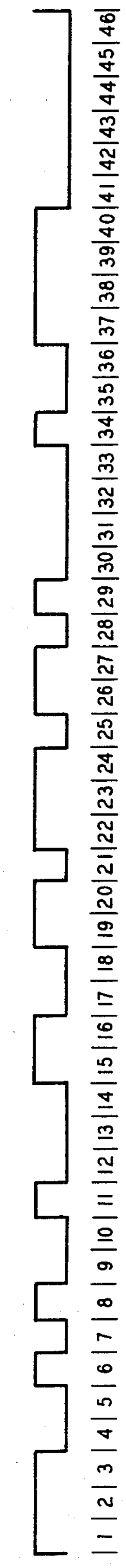
FIG. 2 is a diagram of an illustrative shift register sequence useful in describing the operation of the arrangement of FIG. 1.

An illustrative shift register sequence is depicted in FIG. 2 as may be employed in the word clock track for each memory word location. The particular sequence depicted assumes a memory word length of 46 bits and thus comprises a pattern of 46 bits having, by way of example, an order $n$ of 6 bits. Consequently, each group of 6 adjacent bits is unique within the pattern, such as bits 1 through 6, 2 through 7, 3 through 8, etc., thereby uniquely determining each bit location within a memory word.

Timing circuit 100 comprises a plurality of tandemly connected shift register stages SR1 – SR$n$, the number of stages corresponding to the order $n$ of the shift register sequence to be decoded thereby. Thus, for decoding the illustrative sequence of FIG. 2, timing circuit 100 comprises six tandemly connected stages. Timing circuit 100 further includes decoding logic comprising a plurality of successional gates G1 – G$k$, the number of gates corresponding to the number of bits in the shift register sequence to be decoded, illustratively 46 bits in the example of FIG. 2. In operation, timing circuit 100 decodes the $k$-bit shift register sequence inputted thereto and provides individual bit timing signals through gates G1 – G$k$ on leads BT1 – BT$k$ in succession.

During memory reading and writing operations the bit pulses read from the bit clock track are applied to the SHIFT lead of timing circuit 100, and the shift register sequences read from the word clock track are applied to the SEQUENCE lead. Successive bits of each shift register sequence are thus applied to the first stage SR1 and are shifted through the tandemly connected shift register stages at a rate determined by the bit pulses on the SHIFT lead. Assuming the illustrative sequence of FIG. 2 therefore, the first bit of the sequence applied to stage SR1 is a binary one, the second and third are binary ones, the fourth and fifth are binary zeros, the sixth a binary one and so forth.

The outputs of shift register stages SR1 through SR$n$ are connected in unique Boolean function combinations $f(\overline{A1}$ A1, $\overline{A2}$ A2, . . . $\overline{An}$ A$n$) to the inputs of each of gates G1 – G$k$, the unique combination connected to each gate corresponding to a different group of $n$ adjacent bits in the shift register sequence to be decoded. Thus recalling that the shift register sequence is repeated for successive word locations (or thinking of the sequence as a closed ring), the combinations of shift register outputs $\overline{A1}$ A1 through $\overline{An}$ An connected to the first gate G1 illustratively correspond to bits 42–46 and bit 1 of the sequence in FIG. 2. The combination of outputs $\overline{A1}$ A1 through $\overline{An}$ and A$n$ connected to the next successional gate, gate G2, corresponds to the successive group of $n$ bits, bits 43 through 46, 1 and 2, and so forth, with the combination connected to the last gate G$k$ corresponding to bits 41 through 46. Consequently, as the first bit in the sequence is shifted into stage SR1, a bit timing signal is generated through gate G1 on lead BT1. As the second bit is shifted into stage SR1, and thus the first bit into stage SR2, a bit timing signal is generated through gate G2 on lead BT2, and so on in succession, with the shifting of bit 46 into stage SR1 generating a bit timing signal on lead BTk.

According to our invention, the usual shift register sequence decoding circuitry is modified simply and inexpensively to provide substantially instantaneous detection of errors such as due to an incorrect sequence being shifted into the register. For this purpose, an additional stage SRA is tandemly connected to the last stage SRn of the shift register. The output $\overline{AA}$ AA of stage SRA is connected to the decoding logic gates in the same manner as the outputs of the other shift register stages SR1 – SR$n$. Thus, the outputs of the shift register stages, including stage SRA, are connected to each of gates G1 – G$k$ in a unique Boolean function combination $f$ ($\overline{A1}$ A1, $\overline{A2}$ A2, . . . $\overline{An}$ A$n$, $\overline{AA}$ AA), the combination connected to each gate in accordance with present invention corresponding to a different group of $n$+1 adjacent bits in the shift register sequence. Thus, for error detection purposes in the illustrative example described above, the output $\overline{AA}$ AA of stage SRA corresponding to bit 41 is connected to first gate G1, the output corresponding to bit 42 is connected to gate G2, and so forth, with the output corresponding to bit 40 being connected to the last gate Gk.

It will be apparent that by connecting additional stage SRA to the decoding gates in the same manner as stages SR1 – SR$n$, that is, according to groups of adjacent bits of the sequence to be decoded, the $n$+1 bits in the combined stages at any time represents a valid pattern if the $n$ bits in stages SR1 – SR$n$ is valid. Consequently, the correct bit timing signal will be generated for the particular group of $n$ bits in stages SR1 – SR$n$. If, however, an incorrect bit is shifted into stage SR1, such as due to a noise burst, the n+1 bits will not comprise a valid pattern and therefore none of gates G1 – G$k$ will be enabled to generate a bit timing signal. This will be appreciated from the fact that a given $n$ bit pattern occurs in the shift register sequence only once every $k$ bit times.

An erroneous bit shifted into the shift register is thus reflected substantially instantaneously, in accordance with our invention, as an error condition in the form of an "all zeros" output on leads BT1 – BT$k$. This condition is readily detected by error flip-flop ERR which is set by the all zeros output, illustratively through NAND gate 51 and check gate 53. Check gate 53 is enabled for this purpose by a gating signal on the CHECK lead each time a new sequence bit is shifted into stage SR1. The gating signal for the CHECK lead can be derived, for example, from the bit signals on the SHIFT lead suitably delayed, if necessary, to insure that the shift register stages have all settled down. The set output of flip-flop ERR on lead 55, indicating an error condition, may be utilized in whatever manner is desired for a particular application, following which flip-flop ERR is reset by a signal on the RESET lead.

To illustrate the error detecting capability provided by the arrangement in FIG. 1, assume that a valid bit pattern is in stages SR1 – SRA, such as bits 6 through 12 of the sequence in FIG. 2. A valid bit timing signal is generated thereby on lead BT12 (not shown). The next bit to be shifted into stage SR1 is bit 13 and, if valid (i.e., a binary 0), a bit timing signal is generated on lead BT13 (not shown). If a binary 1 is shifted into stage SR1 in error, resulting in an invalid $n$+1 bit pattern in stages SR1 – SRA, no bit timing signal will be generated on any of leads BT1 – BT$k$, and flip-flop ERR will be set.

However, in the absence of additional stage SRA and the output connections thereof to gates G1 – G$k$, shifting the incorrect binary 1 into stage SR1 produces a valid though incorrect $n$ bit pattern, namely, the pattern corresponding to bits 3 through 8. Consequently, a bit timing signal is generated incorrectly thereby on lead BT8 (not shown), rather than on correct lead BT13.

According to a further aspect of the error detecting arrangement in FIG. 1, we have found that it advantageously detects certain faults internal to the circuitry, such as one of the shift register stages remaining permanently set or reset. This error condition results in an invalid bit pattern occurring in stages SR1 – SRA within $k$ or less shifts, thereby resulting in an all zeros output to set flip-flop ERR. The actual number of shifts within which the error condition is detected depends upon which stage of the shift register is at fault. The closer the fault appears to the end shift register stages, such as stages SR1 and SRA, the more quickly the error condition is detected.

Although the above description has assumed use of the invention in connection with decoding shift register sequences, it will be appreciated that the principles thereof may be employed similarly in connection with the encoding of such sequences. It is understood, therefore, that the above-described arrangements are but illustrative of the principles of our invention. Numerous other arrangements may be devised by those skilled in the art without departing from the spirit and scope of the invention.

What is claimed is:

1. The method of detecting errors in a shift register sequence of order $n$ comprising the steps of decoding groups of $n+1$ adjacent bits in the shift register sequence, providing a predetermined output signal responsive to the decoding of a valid group of $n+1$ bits, and detecting the absence of said output signal.

2. The method in accordance with claim 1 wherein the shift register sequence has a length of $k$ bits, $k$ being greater than $2^{n-1}$ and less than or equal to $2^n$, said method further comprising the steps of providing said output signal on individual ones of $k$ outputs respectively corresponding to different groups of $n+1$ adjacent bits in said shift register sequence, and detecting the absence of said output signal on each of said outputs.

3. In combination, a shift register including $n+1$ tandemly connected shift register stages, means for shifting successive bits of an $n$-order shift register sequence through said shift register stages, a plurality of gating circuits, and means connecting the outputs of said shift register stages to individual ones of said gating circuits in unique combinations respectively corresponding to different groups of $n+1$ adjacent bits in said shift register sequence.

4. The combination in accordance with claim 3 wherein said unique shift register output connection combinations are each Boolean functions having $n+1$ variables.

5. The combination in accordance with claim 3 further comprising means for detecting a predetermined combination of output signals from said gating circuits, said predetermined output signal combination indicating the presence of an error in said shift register sequence.

6. The combination in accordance with claim 5 wherein said detecting means comprises an additional gating circuit connected to the outputs of each of said plurality of gating circuits and responsive to each of said plurality of gating circuits having a like output signal.

7. In an arrangement for detecting errors in an $n$- order shift register sequence having a length of $k$ bits, $n+1$ shift register stages, means connecting said shift register stages in tandem, $k$ gates, means connecting a respective unique combination of the outputs of said stages to each of said gates, said unique combination connected to each said gate corresponding to a different group of $n+1$ adjacent bits in said sequence, and error indication means connected to a predetermined combination of said gates.

8. The arrangement in accordance with claim 7 wherein $k$ is greater than $2^{n-1}$ and less than or equal to $2^n$.

9. In an arrangement for decoding an $n$-order shift register sequence; said arrangement including a shift register having $n$ tandemly connected stages, said shift register including a first stage and a last stage, means for connecting said sequence to said first shift register stage and for shifting said sequence through successive ones of said tandemly connected shift register stages, a plurality of successional gating circuits including a first and last gating circuit, and means connecting individual unique combinations of the outputs of said shift register stages to each of said gating circuits, such that individual ones of said gating circuits are enabled in succession as said sequence is shifted through said shift register stages; the combination for detecting errors in said shift register sequence comprising, an additional stage tandemly connected to said last shift register stage, means for connecting the output of said additional stage to said first gating circuit in the same manner as the output of said last shift register stage is connected to said last gating circuit, means connecting the output of said additional stage to each of the other of said gating circuits in the same pattern as the output of said last shift register stage is connected to the immediately preceding one of said gating circuits, and means responsive to a predetermined output from said gating circuits.

* * * * *